(12) United States Patent
Potts et al.

(10) Patent No.: US 11,764,574 B2
(45) Date of Patent: Sep. 19, 2023

(54) MULTI-VOLTAGE CHARGING APPARATUS

(71) Applicant: Volvo Truck Corporation, Gothenburg (SE)

(72) Inventors: Bart Potts, Clemmons, NC (US); Michael Pruden, Colfax, NC (US); Hans Westerlind, Nol (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 359 days.

(21) Appl. No.: 16/971,717

(22) PCT Filed: Feb. 22, 2018

(86) PCT No.: PCT/US2018/019098
§ 371 (c)(1),
(2) Date: Aug. 21, 2020

(87) PCT Pub. No.: WO2019/164486
PCT Pub. Date: Aug. 29, 2019

(65) Prior Publication Data
US 2021/0384743 A1    Dec. 9, 2021

(51) Int. Cl.
*H02J 1/00* (2006.01)
*H02J 1/10* (2006.01)
(Continued)

(52) U.S. Cl.
CPC ............ *H02J 1/122* (2020.01); *B60R 16/033* (2013.01); *E05B 47/02* (2013.01); *E05B 47/023* (2013.01);
(Continued)

(58) Field of Classification Search
CPC .......... H02J 1/122; H02J 1/082; H02J 7/0031; H02J 7/0034; H02J 7/0042;
(Continued)

(56) References Cited

U.S. PATENT DOCUMENTS

| 3,267,347 A | * | 8/1966 | Godshalk ............... H02J 7/0034 307/127 |
| 4,532,418 A | | 7/1985 | Meese et al. |

(Continued)

FOREIGN PATENT DOCUMENTS

| CN | 2760832 Y | * | 2/2006 |
| CN | 102111077 A | * | 6/2011 |

(Continued)

OTHER PUBLICATIONS

International Search Report and Written Opinion of the International Searching Authority, PCT/US2018/019098, dated May 7, 2018, 8 pages.

(Continued)

*Primary Examiner* — Naum Levin
(74) *Attorney, Agent, or Firm* — Sage Patent Group

(57) ABSTRACT

A charging apparatus includes at least one housing including a compartment, an access door connected to the housing and covering the compartment, the access door being movable from an open position to a closed position, a releasable latching mechanism configured to latch the access door in the closed position, a charging terminal in the compartment, a voltage sensing terminal, and a door release circuit coupled to the voltage sensing terminal and to the releasable latching mechanisms and configured to sense a charging voltage applied to the voltage sensing terminal. The door release circuit is configured to selectively unlatch the releasable latching mechanism in response to a voltage within a predetermined voltage range being applied to the voltage sensing terminal.

16 Claims, 8 Drawing Sheets

(51) Int. Cl.
  *H02J 7/00* (2006.01)
  *B60R 16/033* (2006.01)
  *H01M 10/44* (2006.01)
  *E05B 47/02* (2006.01)
  *H02J 7/34* (2006.01)
  *H02J 1/08* (2006.01)

(52) U.S. Cl.
  CPC ........... *H01M 10/441* (2013.01); *H02J 1/082* (2020.01); *H02J 7/0031* (2013.01); *H02J 7/0034* (2013.01); *H02J 7/0042* (2013.01); *H02J 7/00047* (2020.01); *H02J 7/007182* (2020.01); *H02J 7/342* (2020.01); *H01M 2220/20* (2013.01); *H02J 7/00304* (2020.01); *H02J 2310/46* (2020.01)

(58) Field of Classification Search
  CPC .. H02J 7/007182; H02J 7/342; H02J 7/00304; H02J 2310/46; B60R 16/033; E05B 47/02; E05B 47/023; H01M 10/441; H01M 2220/20; Y02T 10/70; Y02T 10/7072; Y02T 90/12; B60L 53/30
  See application file for complete search history.

(56) References Cited

U.S. PATENT DOCUMENTS

| | | | | |
|---|---|---|---|---|
| 4,972,135 A | * | 11/1990 | Bates | H02J 7/0034 320/105 |
| 5,642,030 A | | 6/1997 | Seelye | |
| 5,781,399 A | | 7/1998 | Lanigan et al. | |
| 7,301,303 B1 | * | 11/2007 | Hulden | H01M 50/291 429/96 |
| 8,919,042 B2 | * | 12/2014 | Vaknin | E05B 63/0004 49/358 |
| 9,085,240 B2 | * | 7/2015 | Rathmacher | B60L 3/0007 |
| 9,512,654 B2 | * | 12/2016 | Armari | E05B 47/0012 |
| 9,912,183 B2 | * | 3/2018 | Kokot, Jr. | H02J 7/342 |
| 10,211,671 B2 | * | 2/2019 | Douer | H02J 7/34 |
| 10,862,231 B2 | * | 12/2020 | Stecewycz | H01R 11/287 |
| 2004/0066168 A1 | | 4/2004 | George et al. | |
| 2009/0039712 A1 | * | 2/2009 | Czarnyszka | H02J 7/0034 307/127 |
| 2009/0174362 A1 | * | 7/2009 | Richardson | H02J 7/0034 320/105 |
| 2011/0174875 A1 | | 7/2011 | Wurzer | |
| 2014/0091761 A1 | | 4/2014 | Uchida et al. | |
| 2016/0329731 A1 | * | 11/2016 | Kokot, Jr. | H02J 7/0048 |
| 2021/0094428 A1 | * | 4/2021 | Nook | B60L 3/0046 |

FOREIGN PATENT DOCUMENTS

| | | | | |
|---|---|---|---|---|
| CN | 202510270 U | * | 10/2012 | |
| CN | 104393713 A | * | 3/2015 | |
| CN | 106374549 A | * | 2/2017 | |
| CN | 206225827 U | * | 6/2017 | |
| CN | 106985671 A | * | 7/2017 | ................ B60L 1/00 |
| CN | 207530573 U | * | 6/2018 | ............. B60R 16/00 |
| CN | 207984765 U | * | 10/2018 | |
| CN | 110023125 B | * | 10/2022 | ............. B60K 15/05 |
| DE | 19946744 A1 | * | 5/2001 | .......... F02N 11/0866 |
| DE | 10313752 A1 | * | 10/2004 | ............. B60L 50/16 |
| DE | 202005006945 U1 | * | 6/2006 | ............. A47B 88/457 |
| DE | 112015004897 T5 | * | 8/2017 | .......... F02N 11/0814 |
| DE | 102017110346 A1 | * | 11/2018 | ......... E05B 47/0004 |
| IL | 108040 A | | 1/1997 | |
| JP | 3391525 B2 | * | 3/2003 | |
| JP | 2008115621 A | * | 5/2008 | |
| JP | 4430746 B2 | * | 3/2010 | ........ H02M 3/33523 |
| JP | 2014166051 A | * | 9/2014 | ............. B60L 15/007 |
| WO | WO-2014142759 A1 | * | 9/2014 | ............. H01M 10/425 |
| WO | WO-2019164486 A1 | * | 8/2019 | .............. B60L 53/30 |

OTHER PUBLICATIONS

Extended European Search Report dated Dec. 20, 2021 for European Patent Application No. 18906778.8, 6 pages.

* cited by examiner

MULTI-VOLTAGE CHARGING APPARATUS

CROSS REFERENCE TO RELATED APPLICATIONS

This application is a 35 U.S.C. § 371 national stage application of PCT International Application No. PCT/US2018/019098 filed on Feb. 22, 2018, the disclosure and content of which is incorporated by reference herein in its entirety.

FIELD

The inventive concepts relate to vehicle electrical systems, and in particular to multi-voltage battery systems for vehicles.

BACKGROUND

Some vehicles, including heavy construction vehicles, may include 24 volt (24V) electrical systems for powering various loads in the vehicle. A 24V vehicle electrical system typically includes first and second 12-volt (12V) batteries, namely, a lower battery and an upper battery, arranged in series to provide a total of 24 volts for powering 24V loads. In this arrangement, the batteries are referred to as the "lower battery" and the "upper battery," because the positive terminal of the upper battery is at a higher electric potential than the positive terminal of the lower battery. Thus, 24V loads can be powered from the positive terminal of the upper battery, while 12V loads can be powered from the positive terminal of the lower battery. When the engine of the vehicle is running, the batteries are charged by a 24V alternator that is connected across both batteries.

In the event that one of the batteries has insufficient charge to operate the vehicle, it is important for there to be a safe and simple way for an operator to jump start the vehicle from either a 12V source or a 24V source. However, attaching a 24V source to a 12V electrical system can damage the 12V electrical system.

SUMMARY

One embodiment of the inventive concepts is directed to a multi-voltage charging apparatus that includes at least one housing including a first compartment and a second compartment, a first access door connected to the housing and covering the first compartment, the first access door being movable from an open position to a closed position, a second access door connected to the housing and covering the second compartment, the second access door being movable from an open position to a closed position, a first releasable latching mechanism configured to latch the first access door in the closed position, a second releasable latching mechanism configured to latch the second access door in the closed position, a first charging terminal in the first compartment, a second charging terminal in the second compartment, a voltage sensing terminal, and a door release circuit coupled to the voltage sensing terminal and to the first and second releasable latching mechanisms and configured to sense a charging voltage applied to the voltage sensing terminal. The door release circuit is configured to selectively unlatch the first releasable latching mechanism in response to a first voltage being applied to the voltage sensing terminal, and to selectively unlatch the second releasable latching mechanism in response to a second voltage being applied to the voltage sensing terminal, the second voltage being different from the first voltage.

A charging apparatus according to further embodiments includes at least one housing including a compartment, an access door connected to the housing and covering the compartment, the access door being movable from an open position to a closed position, a releasable latching mechanism configured to latch the access door in the closed position, a charging terminal in the compartment, a voltage sensing terminal, and a door release circuit coupled to the voltage sensing terminal and to the releasable latching mechanisms and configured to sense a charging voltage applied to the voltage sensing terminal.

A charging apparatus according to further embodiments includes a charging terminal, a ground terminal, and a coupling circuit coupled to the charging terminal, the coupling circuit is configured to sense a charging voltage applied to the charging terminal and to selectively couple the charging terminal to a first charging node in response to a first voltage being applied to the charging terminal, and to selectively couple the charging terminal to a second charging node in response to a second voltage being applied to the voltage sensing terminal, the second voltage being different from the first voltage.

Other apparatus and/or methods for battery charging will be or become apparent to one with skill in the art upon review of the following drawings and shall be included within this description and protected by the accompanying claims. Moreover, it is intended that all embodiments disclosed herein can be implemented separately or combined in any way and/or combination unless expressly excluded.

ASPECTS

According to one aspect, a multi-voltage charging apparatus includes at least one housing including a first compartment and a second compartment, a first access door connected to the housing and covering the first compartment, the first access door being movable from an open position to a closed position, a second access door connected to the housing and covering the second compartment, the second access door being movable from an open position to a closed position, a first releasable latching mechanism configured to latch the first access door in the closed position, a second releasable latching mechanism configured to latch the second access door in the closed position, a first charging terminal in the first compartment, a second charging terminal in the second compartment, a voltage sensing terminal, and a door release circuit coupled to the voltage sensing terminal and to the first and second releasable latching mechanisms and configured to sense a charging voltage applied to the voltage sensing terminal. The door release circuit is configured to selectively unlatch the first releasable latching mechanism in response to a first voltage being applied to the voltage sensing terminal, and to selectively unlatch the second releasable latching mechanism in response to a second voltage being applied to the voltage sensing terminal, the second voltage being different from the first voltage.

According to a further aspect, the first releasable latching mechanism includes a first solenoid and the second releasable latching mechanism includes a second solenoid.

According to a further aspect, the door release circuit includes a voltage regulator configured to supply a third voltage, and a sensing node coupled to the voltage sensing terminal.

According to a further aspect, the door release circuit includes a first transistor switch having an output terminal coupled to the first solenoid and a control terminal coupled to the sensing node, and a second transistor switch coupled in series with the first transistor switch having an input terminal coupled to the voltage regulator, an output terminal coupled to an input terminal of the first transistor switch, and a control terminal coupled to the sensing node.

According to a further aspect, the first transistor switch includes a depletion mode MOSFET that is configured to turn off in response to a first voltage being applied to the sensing node, and the second transistor switch includes an enhancement mode MOSFET that is configured to turn on in response to a second voltage being applied to the sensing node, the first voltage is higher than the second voltage.

According to a further aspect, the multi-voltage charging apparatus includes a third transistor switch having an output terminal coupled to the second solenoid and a control terminal coupled to the sensing node, a fourth transistor switch coupled in series with the third transistor switch having an input terminal coupled to the voltage regulator, an output terminal coupled to an input terminal of the third transistor switch, and a control terminal coupled to the sensing node.

According to a further aspect, the third transistor switch includes a depletion mode MOSFET that is configured to turn off in response to a third voltage being applied to the sensing node, and the fourth transistor switch includes an enhancement mode MOSFET that is configured to turn on in response to a fourth voltage being applied to the sensing node, the third voltage is higher than the fourth voltage, and the second voltage is higher than the third voltage.

According to a further aspect, the first transistor switch and the second transistor switch are arranged to apply the third voltage that is output by the voltage regulator to the first solenoid when a voltage supplied applied to the sensing node is greater than the second voltage and less than the first voltage.

According to a further aspect, the third transistor switch and the fourth transistor switch are arranged to apply the third voltage that is output by the voltage regulator to the second solenoid when the voltage supplied applied to the sensing node is greater than the fourth voltage and less than the third voltage.

According to a further aspect, the multi-voltage charging apparatus includes a rectifier diode between the voltage regulator and the input terminal of the second transistor switch.

According to a further aspect, the door release circuit includes a microcontroller, and first, second, third and fourth transistor switches, each of the first, second, third and fourth transistor switches including a control terminal coupled to the sensing node, an output terminal coupled to the microcontroller, and an input terminal coupled to the voltage regulator. The first and second solenoids are coupled to the microcontroller, and the microcontroller is configured to control the first and second solenoids in response to signals output by the first, second, third and fourth transistors.

According to a further aspect, the first, second, third and fourth transistor switches include normally off enhancement mode MOSFETs, the first, second, third and fourth transistor switches have respective first, second, third and fourth different turn-on voltages.

According to a further aspect, the microcontroller is configured to activate the first solenoid when a voltage applied to the sensing node is between the third and fourth turn-on voltages, and the microcontroller is configured to activate the second solenoid when the voltage applied to the sensing node is between the first and second turn-on voltages.

According to a further aspect, the multi-voltage charging apparatus includes a light emitting diode (LED) coupled to the microcontroller, the microcontroller is configured to cause the LED to emit light in response to the voltage applied at the sensing node not being between the first voltage and the second voltage or between the third voltage and the fourth voltage.

According to a further aspect, the multi-voltage charging apparatus includes a rectifier diode coupled to an output of the voltage regulator.

A charging apparatus according to an aspect includes at least one housing including a compartment, an access door connected to the housing and covering the compartment, the access door being movable from an open position to a closed position, a releasable latching mechanism configured to latch the access door in the closed position, a charging terminal in the compartment, a voltage sensing terminal, and a door release circuit coupled to the voltage sensing terminal and to the releasable latching mechanisms and configured to sense a charging voltage applied to the voltage sensing terminal.

According to a further aspect, the door release circuit is configured to selectively unlatch the releasable latching mechanism in response to a voltage within a predetermined voltage range being applied to the voltage sensing terminal.

A charging apparatus according to a still further aspect includes a charging terminal, a ground terminal, and a coupling circuit coupled to the charging terminal, the coupling circuit is configured to sense a charging voltage applied to the charging terminal and to selectively couple the charging terminal to a first charging node in response to a first voltage being applied to the charging terminal, and to selectively couple the charging terminal to a second charging node in response to a second voltage being applied to the voltage sensing terminal, the second voltage being different from the first voltage.

According to a further aspect, the coupling circuit includes a voltage regulator configured to supply a third voltage, a microcontroller, first, second, third and fourth transistor switches, each of the first, second, third and fourth transistor switches including a control terminal coupled to the charging node, an output terminal coupled to the microcontroller, and an input terminal coupled to the voltage regulator, a first relay coupled to the microcontroller, the charging terminal, and the first charging node, and a second relay coupled to the microcontroller, the charging terminal, and the second charging node. The microcontroller is configured to cause the first relay to controllably couple the charging terminal to the first charging node and the second relay to controllably couple the charging terminal to the second charging node in response to signals output by the first, second, third and fourth transistor switches.

According to a further aspect, the first, second, third and fourth transistor switches include normally off enhancement mode MOSFETs, the first, second, third and fourth transistor switches have respective first, second, third and fourth different turn-on voltages.

According to a further aspect, the relays include optically triggered relays that isolate the charging terminal and the first and second charging nodes from the microcontroller.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION OF EMBODIMENTS

As noted in the Background section above, multi-voltage vehicles may have both a 12V electrical system and a 24V electrical system. In the event a vehicle operator needs to jump start the system, it is desirable to be able to provide external charge from a 12V source or a 24V source. However, attaching a 24V source to a 12V electrical system can damage the 12V electrical system of the vehicle. Attaching an external charge source to a vehicle for jump starting is often performed in harsh environments, possibly in the dark or with little available light. It is possible that an operator may incorrectly attach a charging source to the wrong charging terminal on the vehicle being jump started, e.g., attaching a 24V charging source to a 12V terminal. Some vehicles may even have more than two electrical systems, e.g., 12V, 24V and 48V systems in the same vehicle.

Some embodiments address one or more of the issues described above by providing a multi-voltage charging apparatus that physically controls access to first and second charging terminals, such as a 12V charging terminal and a 24V charging terminal, so that only the correct charging terminal is available for connection to an external charge source. These embodiments sense the external charging voltage at an exposed sensing terminal and then selectively provide physical access only to the charging terminal corresponding to the external charging voltage.

Some further embodiments address one or more of the issues described above by sensing an external charging voltage and selectively connecting the charging voltage only to an internal charging node that corresponds to the external charging voltage.

Various embodiments are described herein by way of non-limiting examples in the context of a multi-voltage vehicle electrical system. It is to be understood that the embodiments are not limited to the particular configurations disclosed herein. Moreover, although various embodiments are described in the context of dual-voltage vehicle electrical systems, it will be appreciated that the concepts and embodiments described herein may be extended to vehicle electrical systems with more or less than two voltage subsystems. For example, in some embodiments, a multi-voltage charging system includes multiple charging terminals configured to accept different ranges of charging voltages. In other embodiments, only a single charging terminal configured to accept a single range of charging voltages is provided. In still other embodiments, a single charging terminal configured to accept a plurality of ranges of charging voltages is provided.

Figure 1:
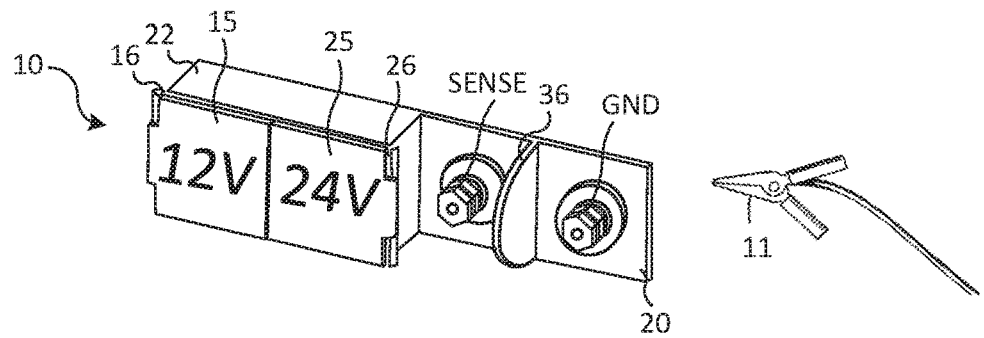
FIG. 1 is a perspective view of a multi-voltage charging apparatus according to some embodiments.
Figure 2A:
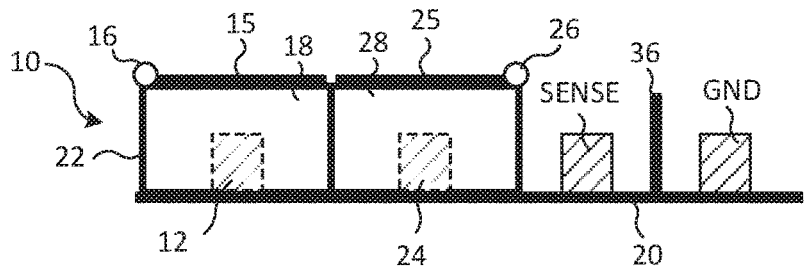
FIGS. 2A, 2B and 2C are side views a multi-voltage charging apparatus according to some embodiments.
Figure 2B:
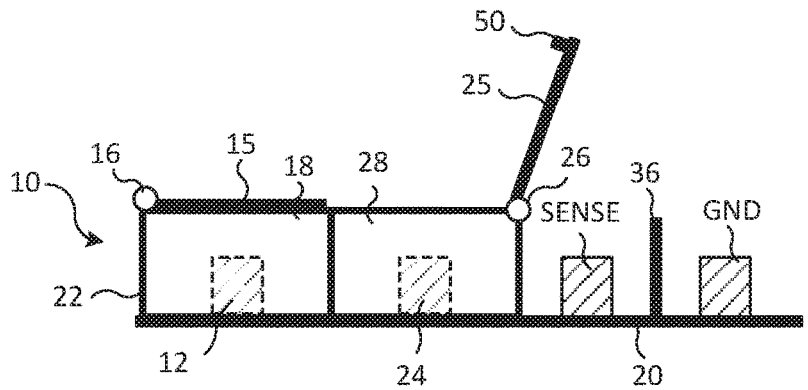
Figure 2C:
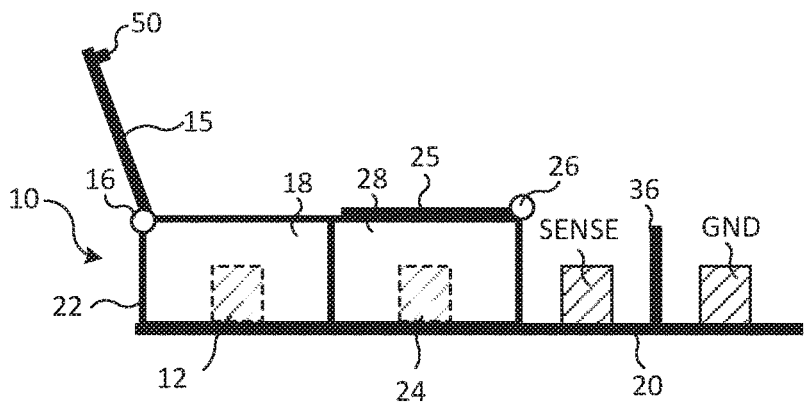

Reference is now made to FIG. 1, which is a perspective illustration of a multi-voltage charging system 10 according to some embodiments, and to FIGS. 2A to 2C, which are side views of the multi-voltage charging system 10. As shown therein, a multi-voltage charging system 10 according to some embodiments includes at least one housing 22 mounted on a support plate 20. Although illustrated as a single housing in the figures, it will be appreciated that the housing 22 may include multiple separate housings joined together and/or mounted separately. The housing 22 includes a first compartment 18 and a second compartment 28 in which a first charging terminal 12 and a second charging terminal 24 are positioned, respectively. The charging terminals 12, 24 may be provided as conductive metallic posts that are electrically connected to an electronics system of a vehicle. Each of the first and second compartments 18, 28 is covered by respective first and second access doors 15, 25 that cover the respective compartments and physically obstruct access to the charging terminal 12, 24 provided within the respective compartment.

The first charging terminal 12 may be connected to a 12V electrical subsystem of a vehicle on which the multi-voltage charging system 10 is provided, and the second charging terminal 24 may be connected to a 24V electrical subsystem of the vehicle. However, other voltages may be used. Moreover, although the multi-voltage charging system 10 is illustrated as having two charging terminals, the system may have more charging terminals to support additional electrical subsystems having different voltage levels, such as 36V, 48V, etc.

The first access door 15, which is connected to the housing 22 covers the first compartment 18, is movable from an open position illustrated in FIG. 2C to a closed position illustrated in FIG. 2A. In the open position (FIG. 2C), the first charging terminal 12 is exposed for access by an operator. In the closed position (FIG. 2A), the first charging terminal 12 is obstructed from access by an operator.

The second access door 25, which is connected to the housing 22 covers the second compartment 28, is movable from an open position illustrated in FIG. 2B to a closed position illustrated in FIG. 2A. In the open position (FIG. 2B), the second charging terminal 24 is exposed for access by an operator. In the closed position (FIG. 2A), the second charging terminal 12 is obstructed from access by an operator.

The first access door 15 may be connected to the housing 22 by a first spring-biased hinge 16 which is biased to move the first access door to the open position when the first access door 15 is unlatched, while the second access door 25 may be connected to the housing 22 by a second spring-biased hinge 26 which is biased to move the second access door to the open position when the second access door 25 is unlatched. That is, when one of the access doors is unlatched, it will spring open to provide physical access to the underlying charging terminal. To close the door, an operator may manually push the access door 15, 25 shut until it latches in place in the closed position.

The multi-voltage charging system 10 may further include a first releasable latching mechanism 40 (FIGS. 6A-6H) that is configured to latch the first access door 15 in the closed position and a second releasable latching mechanism 40 that is configured to latch the second access door 25 in the closed position. As will be described in more detail below, the first and second releasable latching mechanisms 40 may cooperate with latching pins or features 50 provided on the first and second access doors 15, 25.

Still referring to FIGS. 1 and 2A-2C, the multi-voltage charging system 10 may further include a voltage sensing terminal SENSE and a ground terminal GND that may optionally be separated by a divider 36. To operate the multi-voltage charging system 10, an operator connects a ground connector from an external charging source to the ground terminal GND and connects a charging connector 11 from the external charging source to the voltage sensing terminal SENSE. The multi-voltage charging system 10 includes a door release circuit 60 (FIGS. 3, 4, and 5B) coupled to the voltage sensing terminal SENSE and to the first and second releasable latching mechanisms 40. The door release circuit 60 is configured to sense a charging voltage applied to the voltage sensing terminal and selectively operate the first and second releasable latching mechanisms 40 to open the first access door 15 or the second access door 25 depending on the voltage applied at the sensing terminal SENSE. For example, in some embodiments, if the charging voltage applied to the voltage sensing terminal SENSE is within a first acceptable voltage range, such as between 12 volts and 16 volts, the door release circuit 60 may operate to cause the first releasable latching mechanism 40 to open the first access door 15, and if the charging voltage applied to the voltage sensing terminal SENSE is within a second acceptable voltage range, such as between 24 volts and 30 volts, the door release circuit 60 may operate to cause the second releasable latching mechanism 40 to open the second access door 25. If the charging voltage applied to the voltage sensing terminal SENSE is outside both the first acceptable voltage range and the second acceptable voltage range, the door release circuit 60 may operate to keep both the first access door 15 and the second access door 25 latched and closed.

Once one of the access doors 15 and 25 has been unlatched and opened, the operator may move the charging connector to the now-exposed charging terminal and proceed to charge the vehicle electrical system. Accordingly, in some embodiments, access to the incorrect charging terminal may be physically obstructed until an acceptable charging voltage has been applied to the voltage sensing terminal SENSE.

Figure 3:
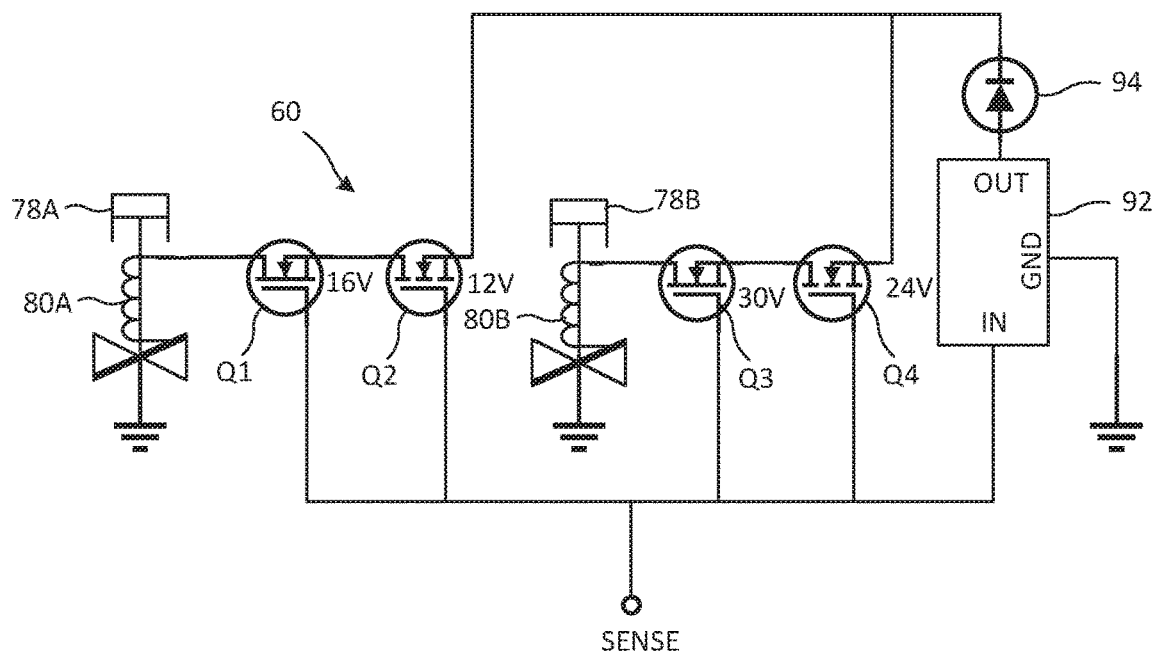
FIG. 3 is a simplified circuit diagram of a door release circuit according to some embodiments.

A door release circuit 60 according to some embodiments is illustrated in FIG. 3. As shown therein, the door release circuit comprises first through fourth transistor switches Q1 to Q4. The first through fourth transistor switches Q1 to Q4 are illustrated as MOSFET switches; however, it will be appreciated that other types of electrically controlled switches, such as bipolar junction transistor (BJT) switches, junction field effect transistor (JFET) switches, thyristors, or other types of elements may be used to form the transistor switches. Moreover, although the first through fourth transistor switches Q1 to Q4 are illustrated as individual transistors, it will be appreciated that one or more of the first through fourth transistor switches Q1 to Q4 may include a plurality of transistors and/or other circuit elements connected together to form switching circuits when properly arranged.

Control terminals, such as gate terminals, of the first through fourth transistor switches Q1 to Q4 are connected to the voltage sensing terminal SENSE, so that a voltage applied to the voltage sensing terminal SENSE will appear at the gate terminals of the first through fourth transistor switches Q1 to Q4. Input terminals, such as source terminals, of the second and fourth transistor switches Q2 and Q4 are connected to an output of a voltage regulator 92 that is arranged to supply a regulated DC voltage of, for example, five volts. A rectifier 94 may be provided at the output of the voltage regulator 92 between the voltage regulator 92 and the input terminals of the second and fourth transistor switches Q2 and Q4. The rectifier 94 may be arranged to obstruct a voltage from the second and fourth transistor switches Q2 and Q4 from being applied to the output of the voltage regulator 92.

An output terminal, e.g. a drain terminal, of the second transistor switch Q2 is connected to an input (source) terminal of the first transistor switch Q1, and a drain terminal of the fourth transistor switch Q2 is connected to a source terminal of the third transistor switch Q3. An output (drain) terminal of the first transistor switch Q1 is coupled to a solenoid 80A which controls a first piston 78A, while a drain terminal of the third transistor switch Q3 is coupled to a solenoid 80B which controls a second piston 78B. The first piston 78A operates the releasable latch mechanism 40 to selectively unlatch the first access door 15, while the second piston 78B operates the releasable latch mechanism 40 to selectively unlatch the second access door 25.

The first through fourth transistor switches Q1 to Q4 have respective different threshold voltages. In particular, the first transistor switch Q1 includes a normally ON depletion mode MOSFET that has a threshold voltage of 16V, while the second transistor switch Q2 includes a normally OFF enhancement mode MOSFET that has a threshold voltage of 12V. Likewise, the third transistor switch Q3 includes a normally ON depletion mode MOSFET that has a threshold voltage of 30V, while the fourth transistor switch Q4 includes a normally OFF enhancement mode MOSFET that has a threshold voltage of 24V. When a charging voltage applied to the voltage sensing terminal SENSE has a voltage level between 12 volts and 16 volts, the second transistor switch Q2 turns ON while the first transistor switch Q1 remains ON, thereby applying the voltage output by the voltage regulator 92 to the first solenoid 80A, which moves the first piston 78A to cause the releasable latching mechanism 40 to unlatch the first access door 15. Similarly, when a charging voltage applied to the voltage sensing terminal SENSE has a voltage level between 24 volts and 30 volts, the fourth transistor switch Q4 turns ON while the third transistor switch Q3 remains ON, thereby applying the voltage output by the voltage regulator 92 to the second solenoid 80B, which moves the second piston 78B to cause the releasable latching mechanism 40 to unlatch the second access door 25.

Note that when the voltage applied to the voltage sensing terminal SENSE is less than 12 volts, the second transistor switch Q2 and the fourth transistor switch Q4 remain OFF, obstructing the voltage output by the voltage regulator from being applied to either the first or second solenoid 80A, 80B. Likewise, when the voltage applied to the voltage sensing terminal SENSE is greater than 30 volts, both the first transistor switch Q1 and the third transistor switch Q3 are turned OFF, again obstructing the voltage output by the voltage regulator from being applied to either the first or second solenoid 80A, 80B. When the voltage applied to the voltage sensing terminal SENSE is greater than 16 volts and less than 24 volts, the first transistor switch Q1 is turned OFF, obstructing the voltage output by the voltage regulator 92 from being applied to the first solenoid 80A, and the fourth transistor switch Q4 remains OFF, obstructing the voltage output by the voltage regulator 92 from being applied to the second solenoid 80B. The operation of the door release circuit 60 is summarized in Table 1.

TABLE 1

Door Release Circuit Operation

| Applied Voltage | Q1 state | Q2 state | Q3 state | Q4 state | 12 V access door state | 24 V access door state |
|---|---|---|---|---|---|---|
| 0 V to 11 V | ON | OFF | ON | OFF | Closed | Closed |
| 12 V to 15 V | ON | ON | ON | OFF | Open | Closed |
| 16 V to 23 V | OFF | ON | ON | OFF | Closed | Closed |
| 24 V to 29 V | OFF | ON | ON | ON | Closed | Open |
| 30 V+ | OFF | ON | OFF | ON | Closed | Closed |

As can be seen in Table 1, the 12V access door 15 is opened only when the applied voltage is between 12V and 15V, while the 24V access door 25 is opened only when the applied voltage is between 24V and 29V. In all other cases, both access doors remain closed.

It will be appreciated that the door release circuit 60 of FIG. 3 could be modified to support additional voltages by providing additional pairs of transistor switches having threshold voltages that define additional acceptable voltage ranges and by providing additional solenoids to operate additional access doors.

It will further be appreciated that the multi-voltage charging system 10 could be modified to support additional voltage ranges by providing additional charging terminals in additional compartments. Moreover, it will be appreciated that the charging system 10 could be modified to support only a single voltage range by providing only a single charging terminal in a single compartment and modifying the door release circuit 60 to check for the single voltage range. Such a single terminal system may still physically restrict access to the single charging terminal unless an appropriate charging voltage is sensed at the voltage sensing terminal.

Figure 4:
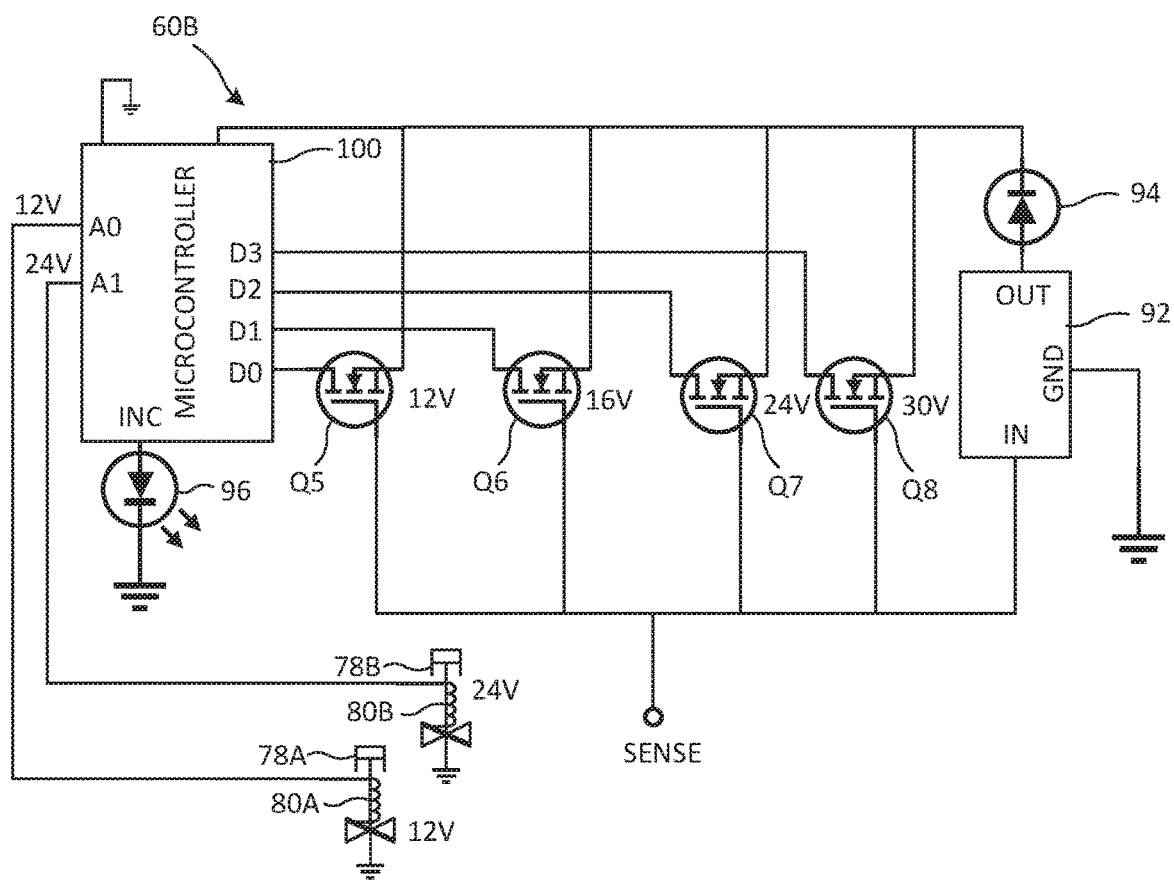
FIG. 4 is a simplified circuit diagram of a door release circuit according to some embodiments.

FIG. 4 illustrates a door release circuit 60B according to further embodiments. The door release circuit 60B includes first to fourth transistor switches Q5, Q6, Q7 and Q8, each of which has a control terminal (gate) connected to the voltage sensing terminal SENSE. In the embodiment illustrated in FIG. 4, each of the first to fourth transistor switches Q5, Q6, Q7 and Q8 includes a normally OFF enhancement mode MOSFET. However, it will be appreciated that other types of electrically controlled switches, such as BJT switches, JFET switches, thyristors, or other types of elements may be used to form the transistor switches. Moreover, although the first through fourth transistor switches Q5 to Q8 are illustrated as individual transistors, it will be appreciated that one or more of the first through fourth transistor switches Q5 to Q8 may include a plurality of transistors and/or other circuit elements connected together to form switching circuits when properly arranged. Each of the first to fourth transistor switches Q5, Q6, Q7 and Q8 has a different threshold voltage at which the transistor turns ON. For example, transistor switch Q5 may have a turn on voltage of 12 volts, transistor switch Q6 may have a turn on voltage of 16 volts, transistor switch Q7 may have a turn on voltage of 24 volts, and transistor switch Q8 may have a turn on voltage of 30 volts.

Input terminals, such as source terminals, of each of the first to fourth transistor switches Q5, Q6, Q7 and Q8 are connected to an output of a voltage regulator 92 that is arranged to supply a regulated DC voltage of, for example, five volts. A rectifier 94 may be provided at the output of the voltage regulator 92 between the voltage regulator 92 and the input terminals of the first to fourth transistor switches Q5 to Q8. The rectifier 94 may be arranged to obstruct a voltage from the first to fourth transistor switches Q5 to Q8 from being applied to the output of the voltage regulator 92.

Output terminals, such as drain terminals, of each of the first to fourth transistor switches Q5 to Q8 are connected to respective data inputs D0 to D3 of a microcontroller 100. The microcontroller 100 includes three data outputs, namely, A0, A1 and INC. Output A0 is connected to the first solenoid 80A which operates the first piston 78A to unlatch the first access door 15 that covers the 12V charging terminal, while output A1 is connected to the second solenoid 80B which operates the second piston 78B to unlatch the second access door 25 that covers the 24V charging terminal. The INC output drives an indicator lamp, such as LED 96.

It will be appreciated that the circuit diagram of FIG. 4 is a highly simplified diagram, and that other components may be included in a final design, such as driver circuits, bias circuits, current limiting resistors, etc. For example, the microcontroller 100 may not be capable of directly supplying sufficient current from an output pin to operate a solenoid. Likewise, in a practical implementation, a current limiting resistor would be provided in series with the LED 96 to prevent overcurrent. Such modifications are within the ordinary skill in the art and are omitted for clarity.

The microcontroller 100 may, for example, be an 8-16- or 32-bit microcontroller. For example, the microcontroller 100 may include a 16F1507 8-bit programmable microcontroller manufactured by Microchip Technology Inc. or similar device.

When the voltage applied at the voltage sensing terminal is less than 12 volts, all four of the first to fourth transistor switches Q5 to Q8 are OFF. When the voltage applied at the voltage sensing terminal is greater than 12 volts but less than 16 volts, then the first transistor switch Q5 is ON, while the remaining three transistor switches Q6 to Q8 are OFF. When the voltage applied at the voltage sensing terminal is greater than 16 volts but less than 24 volts, then the first and second transistor switches Q5 and Q6 are ON, while the remaining two transistor switches Q7 and Q8 are OFF. When the voltage applied at the voltage sensing terminal is greater than 24 volts but less than 30 volts, then the first, second and third transistor switches Q5, Q6 and Q7 are ON, while the remaining transistor switch Q8 is OFF. Finally, when the voltage applied at the voltage sensing terminal is greater than 30 volts, all four transistor switches Q5 to Q8 are ON. The microcontroller 100 sets the output signals A0, A1 and INC in response to the input signals D0 to D3. In particular, the microcontroller 100 sets the output signal A0 to HIGH so that the first solenoid 80A is activated to open the first access door 15 when the input voltage is greater than 12 volts but less than 16 volts (i.e., when input D0 is HIGH and inputs D1 to D3 are LOW). Likewise, the microcontroller 100 sets the output signal A1 to HIGH so that the second solenoid 80B is activated to open the second access door 25 when the input voltage is greater than 24 volts but less than 30 volts (i.e., when inputs D0, D1 and D2 are HIGH and input D3 is LOW). In all other instances, the microcontroller 100 sets the output signal INC to HIGH to cause the indicator lamp 96 to light to indicate that an improper voltage (i.e. a voltage that was not between 12 and 16 volts or between 24 and 30 volts) was applied.

The operation of the door release circuit 60B is summarized in Table 2.

TABLE 2

Door Release Circuit Operation

| Applied Voltage | Input D0 | Input D1 | Input D2 | Input D3 | Output A0 | Output A1 | Output INC |
|---|---|---|---|---|---|---|---|
| 0 V to 11 V | LOW | LOW | LOW | LOW | LOW | LOW | HIGH |
| 12 V to 15 V | HIGH | LOW | LOW | LOW | HIGH | LOW | LOW |
| 16 V to 23 V | HIGH | HIGH | LOW | LOW | LOW | LOW | HIGH |
| 24 V to 29 V | HIGH | HIGH | HIGH | LOW | LOW | HIGH | LOW |
| 30 V+ | HIGH | HIGH | HIGH | HIGH | LOW | LOW | HIGH |

It will be appreciated that the door release circuit 60B of FIG. 4 could be modified to support additional voltages by providing additional inputs and outputs to the microcontroller 110 and by providing additional solenoids to operate additional access doors.

Figure 5A:
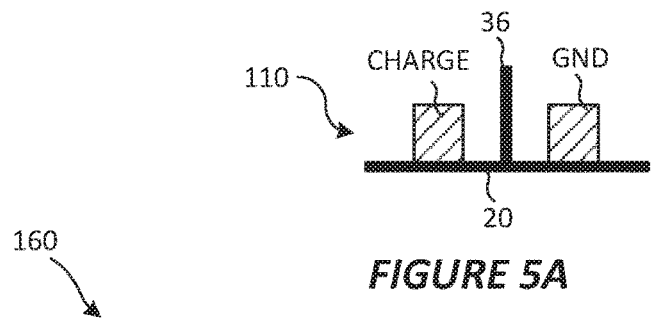
FIG. 5A is a side view of a multi-voltage charging apparatus according to some embodiments.
Figure 5B:
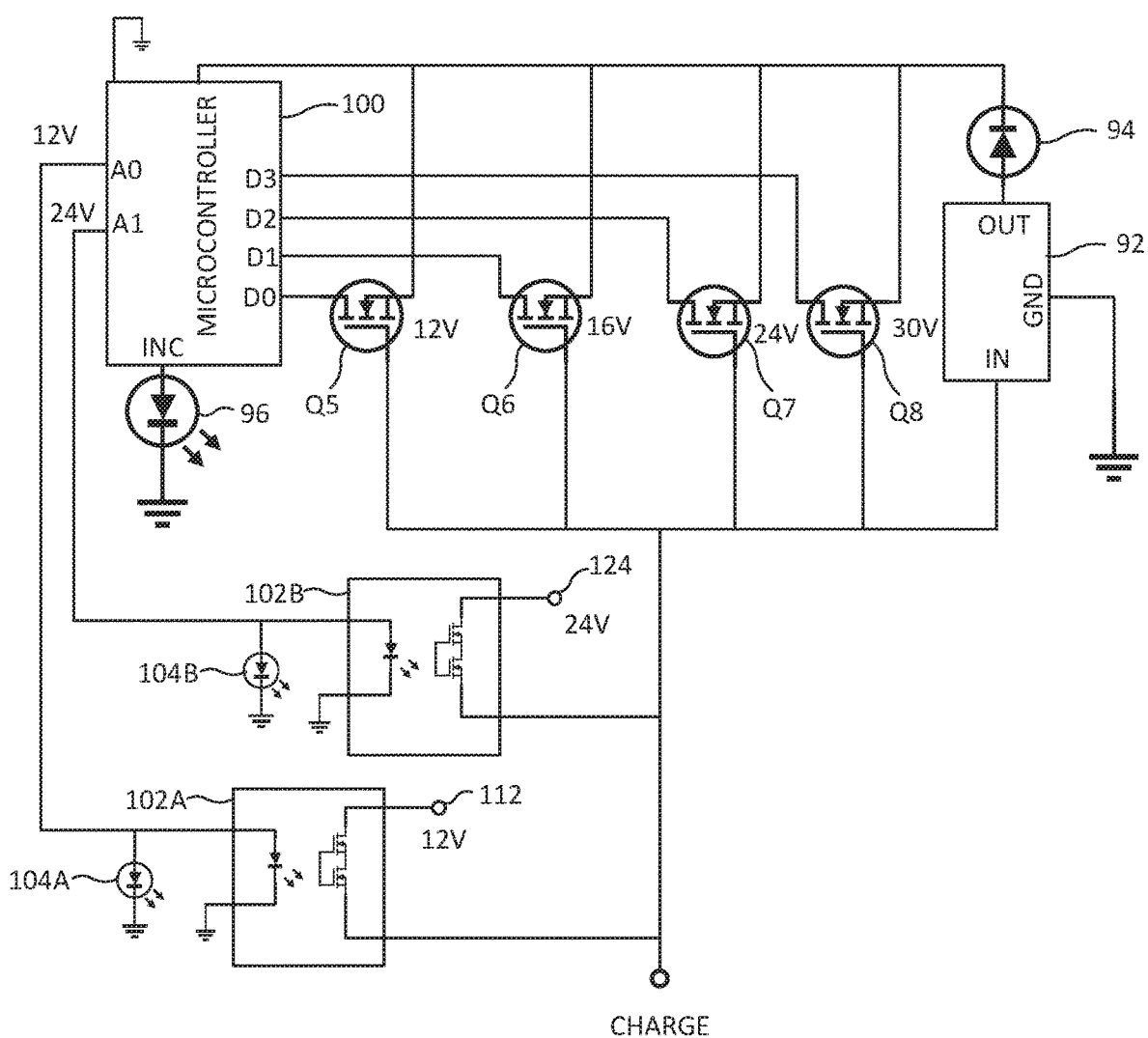
FIG. 5B is a simplified circuit diagram of a coupling circuit according to some embodiments.

FIGS. 5A and 5B illustrate a multi-voltage charging apparatus 110 according to further embodiments. The multi-voltage charging apparatus 110 includes a charging terminal CHARGE and a ground terminal GND mounted on a support plate 20. The charging terminal CHARGE and the ground terminal GND may optionally be separated by a divider 36. The multi-voltage charging apparatus 110 includes a coupling circuit 160 that selectively couples the charging terminal CHARGE to an internal charging node 112, 124 based on a voltage level applied to the charging terminal CHARGE.

Referring to FIG. 5B, the coupling circuit 160 includes first to fourth transistor switches Q5, Q6, Q7 and Q8, each of which has a control terminal (gate) connected to the charging terminal CHARGE, and a microcontroller 100 including inputs D0 to D3 coupled to outputs of the respective transistor switches Q5, Q6, Q7 and Q8 and outputs A0 and A1. The configuration of the microcontroller 100, the transistor switches Q5, Q6, Q7 and Q8, the indicator lamp 96 and the voltage regulator 92 is similar to that shown in the door release circuit 60B of FIG. 4 and further description thereof will be omitted for brevity except for differences in the circuits.

In the coupling circuit 160, the first output A0 is connected to a first solid state relay 102A, while the second output A1 is connected to a second solid state relay 102B. The first solid state relay 102A includes a photodiode and a photosensitive relay circuit that is configured to conduct when the photodiode is energized. Thus, for example, when the first output A0 is HIGH, the LED in the first solid state relay 102A is energized, which activates the photosensitive relay circuit therein. This causes the charging node CHARGE to be coupled to an internal 12 volt charging node 112, and allows a 12-volt battery system to which the internal 12 volt charging node 112 is connected to be charged by the external charge source. Similarly, when the second output A1 is HIGH, the LED in the second solid state relay 102B is energized, which activates the photosensitive relay circuit therein. This causes the charging node CHARGE to be coupled to an internal 24 volt charging node 124, and allows a 24-volt battery system to which the internal 24 volt charging node 124 is connected to be charged by the external charge source.

A first indicator lamp 104A is coupled to the first output A0 to indicate when the 12V system is being charged, while a second indicator lamp 104B is coupled to the second output A1 to indicate when the 24V system is being charged.

It will be appreciated that the multi-voltage charging apparatus 110 of FIGS. 5A and 5B could be modified to support additional voltages by providing additional inputs and outputs to the microcontroller 110 and by providing additional solid state relays.

When the voltage applied at the voltage sensing terminal is less than 12 volts, all four of the first to fourth transistor switches Q5 to Q8 are OFF. When the voltage applied at the voltage sensing terminal is greater than 12 volts but less than 16 volts, then the first transistor switch Q5 is ON, while the remaining three transistor switches Q6 to Q8 are OFF. When the voltage applied at the voltage sensing terminal is greater than 16 volts but less than 24 volts, then the first and second transistor switches Q5 and Q6 are ON, while the remaining two transistor switches Q7 and Q8 are OFF. When the voltage applied at the voltage sensing terminal is greater than 24 volts but less than 30 volts, then the first, second and third transistor switches Q5, Q6 and Q7 are ON, while the remaining transistor switch Q8 is OFF. Finally, when the voltage applied at the voltage sensing terminal is greater than 30 volts, all four transistor switches Q5 to Q8 are ON.

The microcontroller 100 sets the output signals A0, A1 and INC in response to the input signals D0 to D3. In particular, the microcontroller 100 sets the output signal A0 to HIGH so that the first solid state relay 102A is activated to connect the charging terminal CHARGE to the 12 V internal charging node 112 when the input voltage is greater than 12 volts but less than 16 volts (i.e., when input D0 is HIGH and inputs D1 to D3 are LOW). Likewise, the microcontroller 100 sets the output signal A1 to HIGH so that the second solid state relay 102B is activated to connect the charging terminal CHARGE to the 24 V internal charging node 124 when the input voltage is greater than 24 volts but less than 30 volts (i.e., when inputs D0, D1 and D2 are HIGH and input D3 is LOW). In all other instances, the microcontroller 100 sets the output signal INC to HIGH to cause the indicator lamp 96 to light to indicate that an improper voltage (i.e. a voltage that was not between 12 and 16 volts or between 24 and 30 volts) was applied. The operation of the coupling circuit 160 is the same as that shown in Table 2 for the door release circuit 60B. Once the microcontroller 100 sets the output signal A0, A1 to HIGH, the microcontroller 100 may latch the output signal A0, A1 at HIGH so that the solid state relay 102A, 102B that was activated remains on even if the input voltage at the charging terminal CHARGE drops when the starter of the vehicle is engaged. In some embodiments, separate resettable latch circuits (not shown) may be provided between the microcontroller 100 and the solid state relays 102A, 102B. The design of resettable latch circuits, such as SR flip flop circuits, is well known in the art.

Figure 6A:
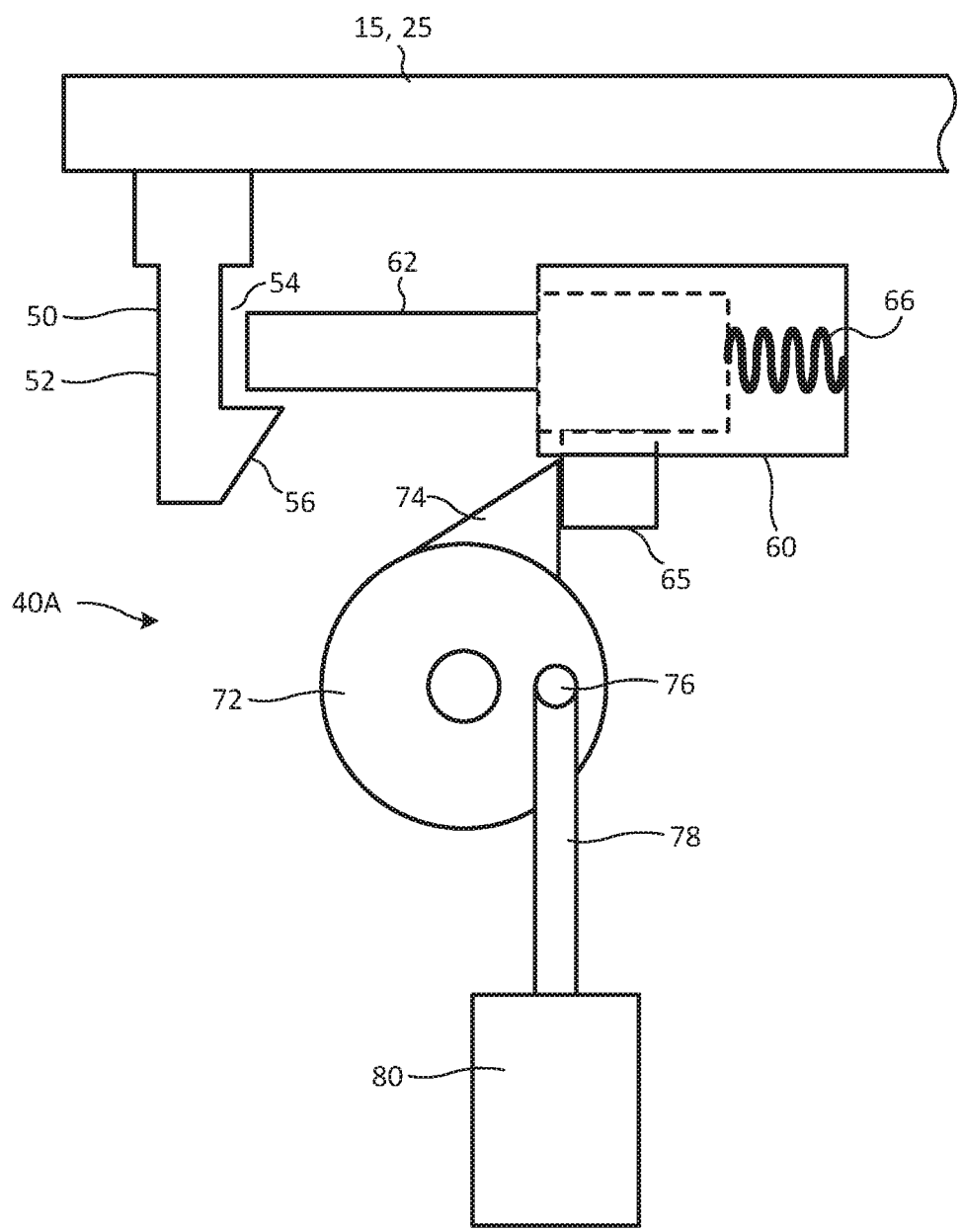
FIGS. 6A and 6B illustrate a releasable latching mechanism according to some embodiments.
Figure 6B:
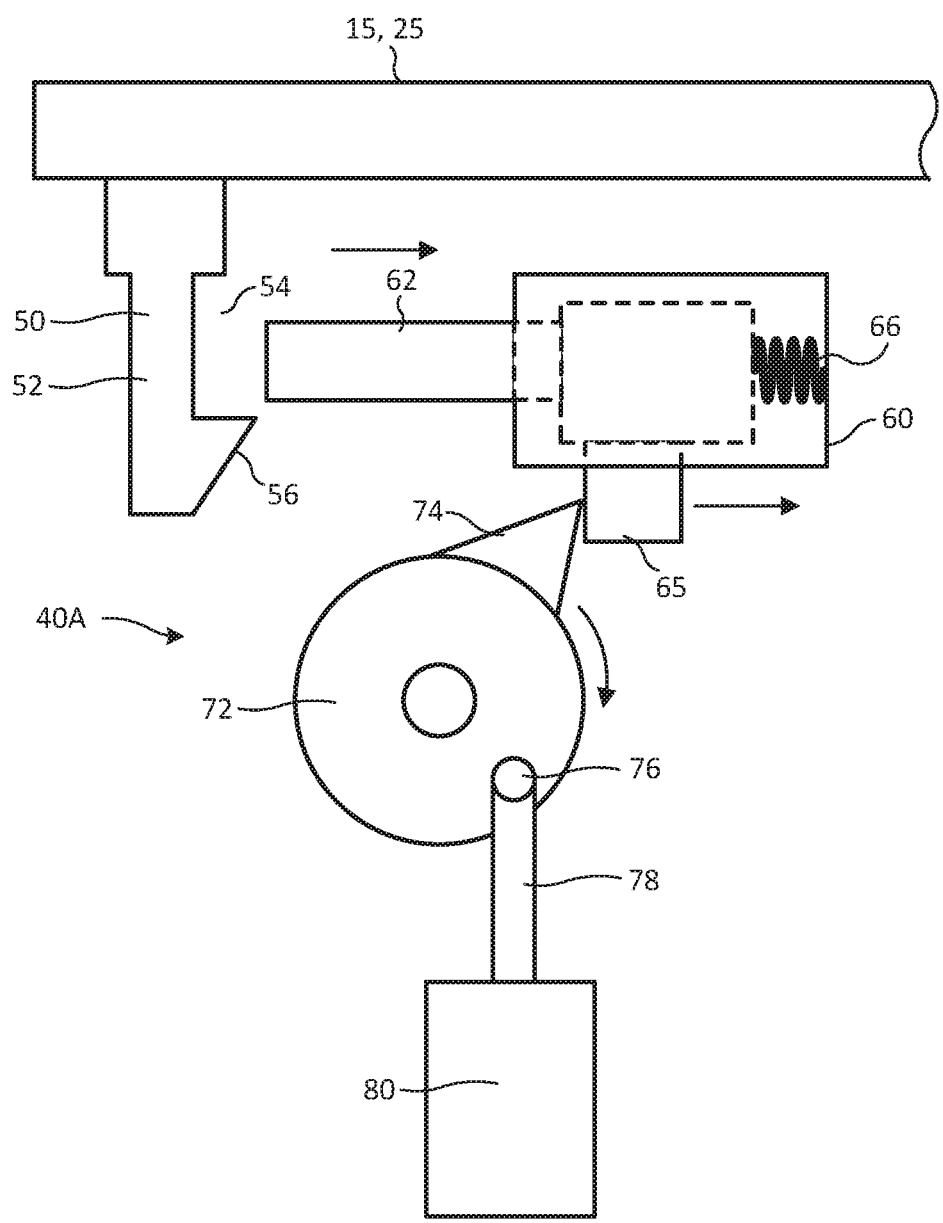

FIGS. 6A and 6B illustrate a releasable latching mechanism 40A according to some embodiments. Referring to FIGS. 6A and 6B, the releasable latching mechanism 40A includes a latching pin 50 including a body 52, a notch 54 in the body 52 and a wedge 56 at the end of the body 52. The latching pin 50 is affixed to one of the access doors 15, 25. A latching arm 62 extends from a housing 60 into the notch 54 when the access door 15, 25 is in the latched (closed) position. The latching arm 62 is biased against the latching pin 50 by a bias spring 66 within the housing 60. An extension 65 of the latching arm 62 extends from the housing 60 in a longitudinal slot (not shown) that allows the latching arm 60 and the extension 65 to move longitudinally within the housing 60. A rotating cam 72 includes a tooth 74 that engages the extension 65 of the latching arm 62 to move the latching arm 62 away from the latching pin 50 when the cam 72 is rotated in the clockwise direction. When the cam 72 is rotated in the counterclockwise direction, the bias spring 66 pushes the latching arm back towards the latching pin 50.

The cam 72 is rotated by a solenoid 80 that drives a piston 78 attached to the cam 72 by a pin 76. As described above, the solenoid 80 is controlled by a circuit, such as the door release circuit 60, 60B shown in FIGS. 3 and 4.

Figure 6C:
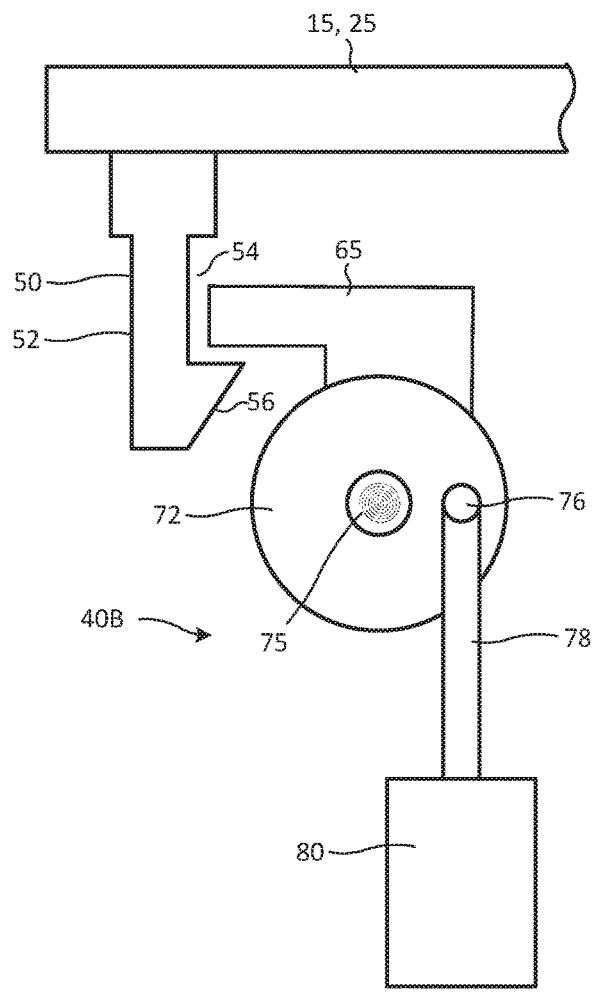
FIGS. 6C and 6D illustrate a releasable latching mechanism according to further embodiments.
Figure 6D:
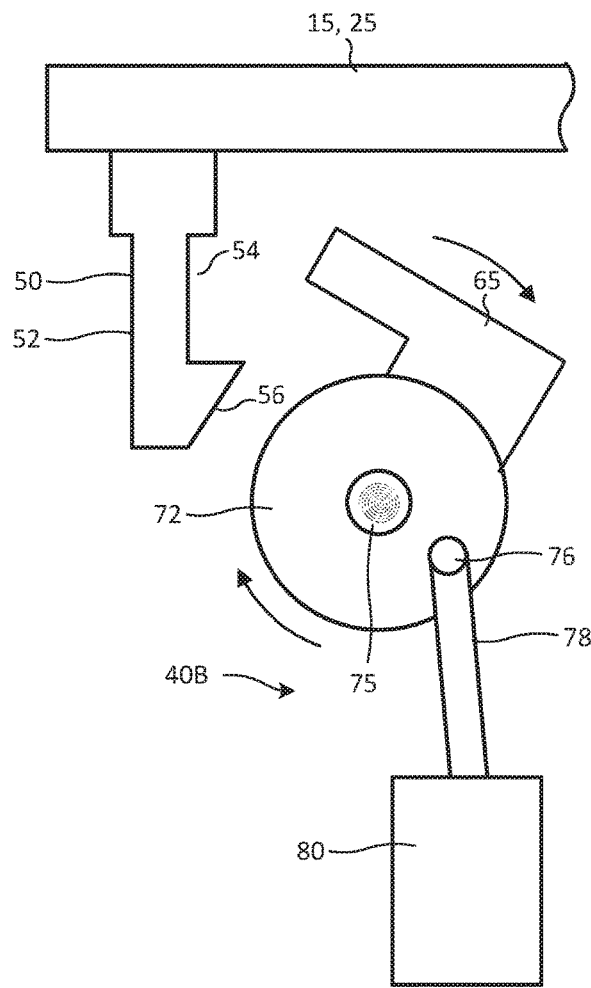

FIGS. 6C and 6DB illustrate a simplified releasable latching mechanism 40B according to further embodiments. Referring to FIGS. 6C and 6D, the releasable latching mechanism 40A includes a latching pin 50 including a body 52, a notch 54 in the body 52 and a wedge 56 at the end of the body 52. The latching pin 50 is affixed to one of the access doors 15, 25. A rotating cam 72 is connected to a latching arm 65 that holds the latching pin in place when held in the latched position shown in FIG. 6C, and rotates away from the latching pin 50 to an unlatched position when the cam 72 is rotated in the clockwise direction. A coil spring 75 in the cam urges the cam to rotate back in the counterclockwise direction, pushing the latching arm back towards the latching pin 50.

The cam 72 is rotated in the clockwise direction by a solenoid 80 that drives a piston 78 attached to the cam 72 by a pin 76. As described above, the solenoid 80 is controlled by a circuit, such as the door release circuit 60, 60B shown in FIGS. 3 and 4.

Figure 6E:
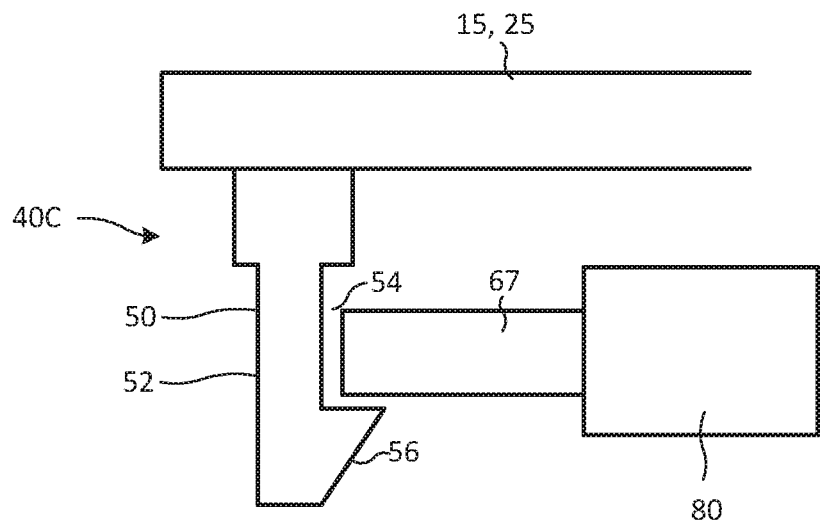
FIGS. 6E and 6F illustrate a releasable latching mechanism according to further embodiments.
Figure 6F:
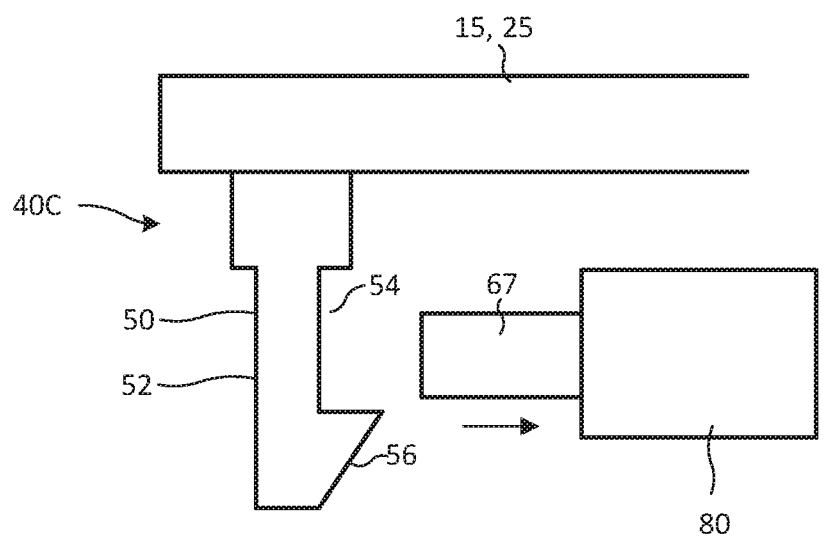

FIGS. 6E and 6F illustrate an even more simplified releasable latching mechanism 40C in which a latching arm 67 is driven directly as a piston by a solenoid 80 to engage or disengage a latching pin 50 to latch and unlatch an access door 15, 25.

Figure 6G:
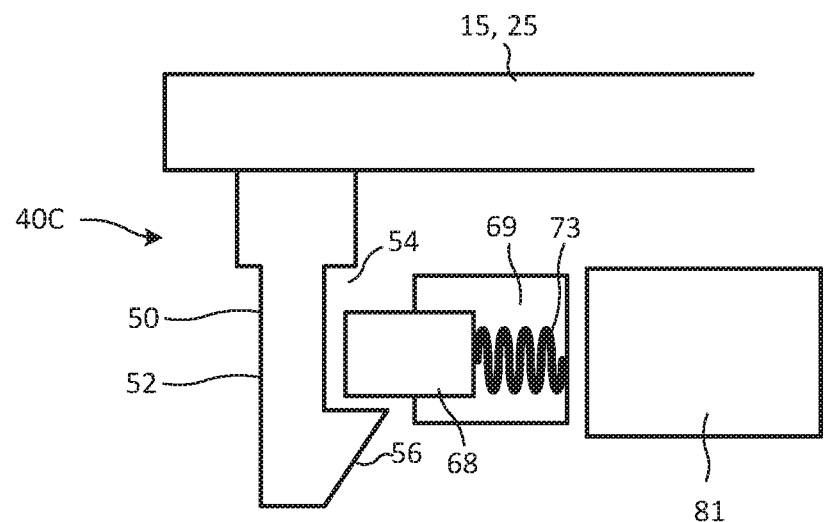
FIGS. 6G and 6H illustrate a releasable latching mechanism according to further embodiments.
Figure 6H:
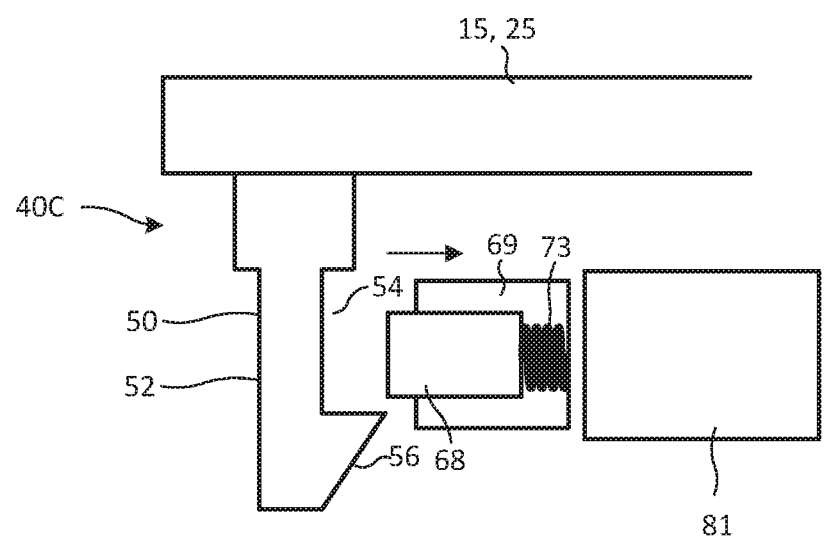

FIGS. 6G and 6H illustrate a magnetic releasable latching mechanism 40D that includes a ferrous latching arm 68 mounted in a housing 69 and biased against the latching pin 50 by a spring 73. A coil 81 acts as an electromagnet to move the ferrous latching arm 68 out of engagement with the latching pin 50 to unlatch the access door 15, 25. The coil 81 is energized by a signal generated by a circuit, such as the door release circuit 60, 60B shown in FIGS. 3 and 4.

From the foregoing description of various releasable latching mechanisms, it will be apparent that many different type of latching mechanisms may be used to selectively unlatch one or more access doors that provide access to charging terminals. Some embodiments of the inventive concepts described herein are not limited by the particular latching mechanism employed.

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Persons skilled in the art will recognize that certain elements of the above-described embodiments may variously be combined or eliminated to create further embodiments, and such further embodiments fall within the scope and teachings of inventive concepts. It will also be apparent to those of ordinary skill in the art that the above-described embodiments may be combined in whole or in part to create additional embodiments within the scope and teachings of inventive concepts. Thus, although specific embodiments of, and examples for, inventive concepts are described herein for illustrative purposes, various equivalent modifications are possible within the scope of inventive concepts, as those skilled in the relevant art will recognize. Accordingly, the scope of inventive concepts is determined from the appended claims and equivalents thereof.

The invention claimed is:

1. A multi-voltage charging apparatus, comprising:
a first compartment and a second compartment defined within at least one housing;
a first access door connected to the at least one housing and covering the first compartment, the first access door being movable from an open position to a closed position;
a second access door connected to the at least one housing and covering the second compartment, the second access door being movable from an open position to a closed position;
a first releasable latching mechanism configured to latch the first access door in the closed position;
a second releasable latching mechanism configured to latch the second access door in the closed position;
a first charging terminal in the first compartment;
a second charging terminal in the second compartment;
a voltage sensing terminal; and
a door release circuit coupled to the voltage sensing terminal and to the first and second releasable latching mechanisms and configured to sense a charging voltage applied to the voltage sensing terminal;
wherein the door release circuit is configured to selectively unlatch the first releasable latching mechanism in response to a first voltage being applied to the voltage sensing terminal, and to selectively unlatch the second releasable latching mechanism in response to a second voltage being applied to the voltage sensing terminal, the second voltage being different from the first voltage.

2. The multi-voltage charging apparatus of claim 1, wherein the first releasable latching mechanism comprises a first solenoid and the second releasable latching mechanism comprises a second solenoid.

3. The multi-voltage charging apparatus of claim 2, wherein the door release circuit comprises:
a voltage regulator configured to supply a third voltage; and
a sensing node coupled to the voltage sensing terminal.

4. The multi-voltage charging apparatus of claim 3, wherein the door release circuit further comprises:
a first transistor switch having an output terminal coupled to the first solenoid and a control terminal coupled to the sensing node; and
a second transistor switch coupled in series with the first transistor switch having an input terminal coupled to the voltage regulator, an output terminal coupled to an input terminal of the first transistor switch, and a control terminal coupled to the sensing node.

5. The multi-voltage charging apparatus of claim 3, wherein the door release circuit further comprises:
a microcontroller; and
first, second, third and fourth transistor switches, each of the first, second, third and fourth transistor switches comprising a control terminal coupled to the sensing node, an output terminal coupled to the microcontroller, and an input terminal coupled to the voltage regulator;
wherein the first and second solenoids are coupled to the microcontroller, and wherein the microcontroller is configured to control the first and second solenoids in response to signals output by the first, second, third and fourth transistors.

6. The multi-voltage charging apparatus of claim 5, wherein the first, second, third and fourth transistor switches comprise normally off enhancement mode MOSFETs, wherein the first, second, third and fourth transistor switches have respective first, second, third and fourth different turn-on voltages.

7. The multi-voltage charging apparatus of claim 5, further comprising a rectifier diode coupled to an output of the voltage regulator.

8. The multi-voltage charging apparatus of claim 6, wherein the microcontroller is configured to activate the first solenoid when a voltage applied to the sensing node is between the third and fourth turn-on voltages, and wherein the microcontroller is configured to activate the second solenoid when the voltage applied to the sensing node is between the first and second turn-on voltages.

9. The multi-voltage charging apparatus of claim 8, further comprising a light emitting diode (LED) coupled to the microcontroller, wherein the microcontroller is configured to cause the LED to emit light in response to the voltage applied at the sensing node not being between the first voltage and the second voltage or between the third voltage and the fourth voltage.

10. The multi-voltage charging apparatus of claim 4, further comprising a rectifier diode between the voltage regulator and the input terminal of the second transistor switch.

11. The multi-voltage charging apparatus of claim 4, wherein the first transistor switch comprises a depletion mode MOSFET that is configured to turn off in response to a first voltage being applied to the sensing node, and wherein the second transistor switch comprises an enhancement mode MOSFET that is configured to turn on in response to a second voltage being applied to the sensing node, wherein the first voltage is higher than the second voltage.

12. The multi-voltage charging apparatus of claim 11, further comprising:
a third transistor switch having an output terminal coupled to the second solenoid and a control terminal coupled to the sensing node;
a fourth transistor switch coupled in series with the third transistor switch having an input terminal coupled to the voltage regulator, an output terminal coupled to an input terminal of the third transistor switch, and a control terminal coupled to the sensing node.

13. The multi-voltage charging apparatus of claim 12, wherein the third transistor switch comprises a depletion mode MOSFET that is configured to turn off in response to a third voltage being applied to the sensing node, and wherein the fourth transistor switch comprises an enhancement mode MOSFET that is configured to turn on in response to a fourth voltage being applied to the sensing node, wherein the third voltage is higher than the fourth voltage, and wherein the second voltage is higher than the third voltage.

14. The multi-voltage charging apparatus of claim 13, wherein the first transistor switch and the second transistor switch are arranged to apply the third voltage that is output by the voltage regulator to the first solenoid when a voltage supplied applied to the sensing node is greater than the second voltage and less than the first voltage.

15. The multi-voltage charging apparatus of claim 14, wherein the third transistor switch and the fourth transistor switch are arranged to apply the third voltage that is output by the voltage regulator to the second solenoid when the voltage supplied applied to the sensing node is greater than the fourth voltage and less than the third voltage.

16. A charging apparatus, comprising:
at least one housing including a compartment;
an access door connected to the at least one housing and covering the compartment, the access door being movable from an open position to a closed position;
a releasable latching mechanism configured to latch the access door in the closed position;
a charging terminal in the compartment;
a voltage sensing terminal; and
a door release circuit coupled to the voltage sensing terminal and to the releasable latching mechanisms and configured to sense a charging voltage applied to the voltage sensing terminal;
wherein the door release circuit is configured to selectively unlatch the releasable latching mechanism in response to a voltage within a predetermined voltage range being applied to the voltage sensing terminal.

* * * * *